Figure 1:
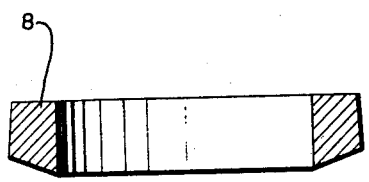

June 8, 1965   J. H. CAIRNS   3,187,531
EXTRUSION OF METALS

Filed May 14, 1964   2 Sheets-Sheet 1

Inventor
John H. Cairns
By
Watson, Cole, Grindle + Watson
Attys.

United States Patent Office 3,187,531
Patented June 8, 1965

3,187,531
EXTRUSION OF METALS
John Harper Cairns, Haigh Park Road, Stourton,
Leeds, England
Filed May 14, 1964, Ser. No. 367,414
Claims priority, application Great Britain, June 21, 1962,
23,888/62
2 Claims. (Cl. 72—41)

This application is a continuation-in-part of application, Serial No. 288,826, filed June 18, 1963, and now abandoned.

This invention relates to the extrusion of metals of solid or hollow section and includes a method for improving the extrusion process.

In the so called direct or forward extrusion process, the normally accepted practice for non-ferrous metals and alloys is to use billets with an as-cast surface. Such billets, after heating to the required extrusion temperature, are inserted into the extrusion press container and during extrusion the main bulk of the billet is sheared from the outside surface, the former passing through the die and the latter being left in the container. This process is generally known as non-lubricated extrusion and, whilst it produces material of good quality, it has a particular disadvantage in that a high specific pressure is required for extrusion. A further disadvantage is the extrusion defect, known as "double walling" or "piping," which can sometimes form at the rear end of the extruded product.

An alternative extrusion method is that which is commonly known as lubricated extrusion. In this process, the inside surface of the container or the outer surface of the billet is coated with a layer of some lubricant, such as oil, graphite or a mixture of both or glass prior to inserting the heated billet. During extrusion, the outside surface of the billet passes through the die and becomes the outside surface of the extruded product. With this process a lower extrusion pressure is required and the risk of forming a "double wall" or "piping" defect is eliminated. Because of the lower extrusion pressure, larger size billets can be extruded for a given press power. A disadvantage however, is that, with cast billets, the surface quality of the extruded product is inferior to that produced by non-lubricated extrusion; this is because defects in the surface of the cast billets are retained in an extended form in the surface of the extruded product. This difficulty is sometimes avoided by machining the billets to remove the defective cast surface, but fully protective-atmosphere heating must then be used in order to prevent excessive oxidation of the machine's billet surface during heating to the extrusion temperature. This procedure is relatively expensive and offsets the economic advantages of lubricated extrusion.

It is also known to remove the outside surface of the hot billet by the face of a container press acting as a scalping die. However, this known procedure suffers from the distinct disadvantage that the diameter of the scalped billet is equal to that of the press container and any lubricant which has been applied to the container walls will be removed by the act of inserting the tightly filling billet. This results in erratic extrusion performance and produces material of inconsistent quality. Alternatively, a scalping die of smaller diameter than the container bore has been fixed to the mouth of the container, but this has necessitated subsequent removal of such scalping die before each extrusion (with associated difficulties of re-alignment and increased extrusion cycle time) in order to allow the pressure disc to enter the container. The use of a pressure disc small enough to pass through the scalping die is impracticable on account of the back flow of metal which would occur between the container wall and the smaller pressure disc during extrusion. This would give rise to extrusion defects and to a high required extrusion pressure.

It is an important object of the present invention to provide a method which will combine the advantages of lubricated and unlubricated extrusion without the corresponding disadvantages, and which will overcome the disadvantage associated with the press container when acting also as the scalping die.

Another object of the invention is to provide a method of hot scalping extrusion billets, to a diameter smaller than that of the press container into which the billet is to be inserted, as a separate operation between re-heating the billet and inserting the billet into said press container. "Separate," when used in the specification and the appended claims means independent of time in the operations, i.e. not necessarily concurrent with nor consecutive to each other.

A further object of the invention is to provide a method of scalping a small thickness of metal from the leading end face of the billet before or after the aforementioned scalping of the billet side to a diameter smaller than that of the press container into which the billet is to be subsequently inserted.

The removal of a small thickness of metal from the leading end face of a billet to be subsequently extruded has a number of advantages amongst which may be mentioned the removal of contamination which may have occurred during heating of the billet to a desired extrusion temperature and the removal of saw defects such as burrs or out of squareness which may be present due to errors during the billet cutting operation.

Thus in accordance with this invention the outside surface of the billet is removed after pre-heating to extrusion temperature, as a separate operation and independent of subsequent insertion into the extrusion press.

In the carrying out of the method according to the invention the outside surface of the billet is preferably removed by means of a scalping die through which the hot billet is pushed by some suitable means such as a hydraulic or mechanical ram, the size of the scalping die being such that the scalped billet will then slide readily into the press container, and in so doing, will not remove the lubricant which has been applied to the bore of the container. Either before or after the "side scalping" of the billet, the leading end of the billet may be scalped to remove a small thickness of metal by means of a shearing blade.

Figure 2:
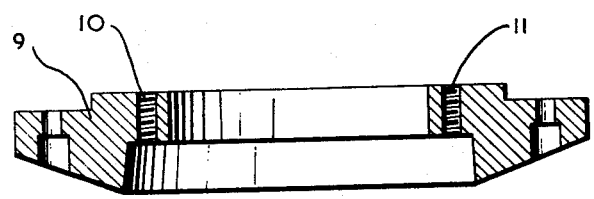
Figure 3:
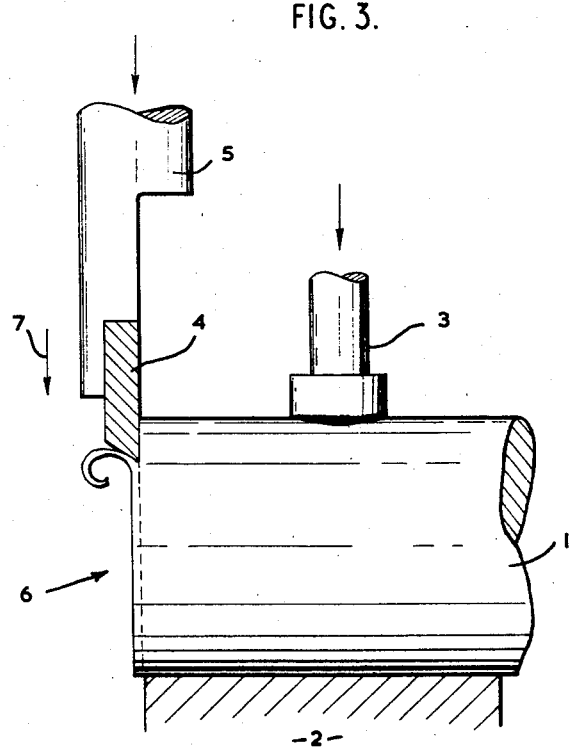

In order that the invention may be more readily understood, it will now be described by way of example only with reference to the accompanying drawings in which:

FIGURE 1 is a scalping die.
FIGURE 2 is a suitable die holder therefor; and
FIGURE 3 is a part elevational and part sectional view of a billet being "end" scalped.

Referring to FIGURES 1 and 2, the scalping die 8 is adapted to fit into the holder 9 with a press fit in accordance with customary practice. The die may be constructed of 10% tungsten steel and the die holder with heat resisting steel. The die, will of course, be necessarily hardened and ground. The tapped holes 10 and 11 are also provided for fixing purposes.

The internal diameter of the scalping die 8 may be varied but in all cases is less than the bore of the press container into which the billet is to be passed.

In operation the billet is initially pre-heated and then passed through the scalping die 8 in order that the cutting edge 12 of the die may remove the outer side surfaces of the billet so that the latter is left with a smooth surface of a predetermined diameter. The billet may then be passed to the separate lubricated press container and extruded normally, the extrusion taking place without the lubricant being removed from the container bore. The use of the separate press container (i.e. separate from the scalping die) is essential to the invention since by this provision, a normal sized back pressure disc can be used with the press container without the smaller diameter scalping die interfering with the movement of the relatively larger diameter of the pressure disc.

It will be seen that the scalping die may easily be removed from the holder for sharpening as necessary and also for altering the sizes of the scalped billet without interfering with the extrusion cycle occurring in the press container.

This method enables all the advantages of lubricated extrusion to be obtained without the high costs of billet machining and protective atmosphere heating which are normally necessary with such processes. These advantages include a lesser incidence of extrusion defects, reduced extrusion pressure and hence greater billet size from a given press power. Furthermore, no increase in the extrusion cycle time is required and whilst one billet is being extruded the following billet can be scalped. Maintenance and replacement of the scalping die can also be carried out without interfering with the extrusion process.

The length of time between the removal of the outside surface by scalping, and the insertion of the billet into the press container also can be varied, thus allowing a degree of control over the thickness of oxide film on the billet surface which will be formed by contact with the atmosphere after scalping. (A controlled, and uniformly thin oxide film on the billet surface is important in the case of some alloys in order to achieve minimum frictional losses at the interface between the outside of the billet and the lubricated bore of the container during extrusion.)

Referring to FIGURE 3 a billet 1, is supported as shown on a support 2 with its longitudinal axis horizontal. A clamp 3 serves to retain the billet in position on its support and the clamp may be operated by means of a mechanical or hydraulic means (not shown). A shearing blade 4, located in and rigidly held by support member 5 is located in relation to the billet end 6 (the leading end) in such a manner that when moving vertically downwards in the direction of the arrow 7 it will remove a desired thickness of metal from the leading end. The thickness of metal removed depends on subsequent operational requirements but is generally of the order of ⅛ inch.

The shearing blade may be of any suitable and known form and may either operate with a vertical cut as described above or alternatively may provide a horizontal or a rotational cut.

It is to be understood that all variations and subcombinations of the methods above described are considered as part of the present invention save only as they may be limited by the scope of the appended claims.

I claim:
1. A method of commencing the extrusion of a billet comprising the steps of forcing said billet through a scalping die in a press separate from the extrusion press, said scalping die having a diameter smaller than the diameter of the extrusion press container to allow for a layer of lubricant in said container, scalping the leading edge of said billet, placing a layer of lubricant in said extrusion press container, inserting said billet in said extrusion press container, and commencing extrusion.

2. A method of commencing the extrusion of a billet comprising the steps of scalping the leading edge of said billet, forcing said billet through a scalping die in a press separate from the extrusion press, said scalping die having a diameter smaller than the diameter of the extrusion press container to allow for a layer of lubricant in said container, placing a layer of lubricant in said extrusion press container, inserting said billet in said extrusion press container, and commencing extrusion.

References Cited by the Examiner
UNITED STATES PATENTS

| | | | |
|---|---|---|---|
| 2,045,786 | 6/36 | Lorant | 207—9 |
| 2,203,376 | 6/40 | Witte | 207—10.5 |
| 2,688,400 | 9/54 | Ansel | 207—17 |
| 2,925,610 | 2/60 | Friedman | 10—76 |
| 3,096,881 | 7/63 | Tombaugh | 207—10.1 |

CHARLES W. LANHAM, *Primary Examiner.*
MICHAEL V. BRINDISI, *Examiner.*